US012621034B2

(12) United States Patent
Gao et al.

(10) Patent No.: US 12,621,034 B2
(45) Date of Patent: May 5, 2026

(54) ONE-SHOT BEAM MANAGEMENT

(71) Applicant: QUALCOMM Incorporated, San Diego, CA (US)

(72) Inventors: Kang Gao, San Diego, CA (US); Yongle Wu, San Diego, CA (US); Jun Zhu, San Diego, CA (US); Mihir Vijay Laghate, San Diego, CA (US); Derrick Albert Chu, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 602 days.

(21) Appl. No.: 18/050,981

(22) Filed: Oct. 28, 2022

(65) Prior Publication Data

US 2024/0146379 A1 May 2, 2024

(51) Int. Cl.
*H04B 7/06* (2006.01)
*H04W 24/08* (2009.01)

(52) U.S. Cl.
CPC .......... *H04B 7/0695* (2013.01); *H04W 24/08* (2013.01)

(58) Field of Classification Search
CPC ..... H04B 7/0695; H04W 24/08; H04W 48/20
USPC ......................................... 370/252
See application file for complete search history.

(56) References Cited

U.S. PATENT DOCUMENTS

| | | | | |
|---|---|---|---|---|
| 7,894,538 B2 * | 2/2011 | Walton | ................ | H04L 25/0204 375/299 |
| 9,877,327 B2 * | 1/2018 | Yu | ........................ | H04B 7/0617 |
| 10,033,513 B2 * | 7/2018 | Wu | ........................ | H04J 11/004 |
| 10,084,521 B2 * | 9/2018 | Ko | ........................ | H04L 5/0048 |
| 10,264,525 B2 * | 4/2019 | Pratt | .................... | H04W 40/16 |
| 10,707,974 B1 * | 7/2020 | Ho | ........................ | H04W 72/29 |
| 11,509,369 B2 * | 11/2022 | Ji | ........................ | H04L 5/0057 |
| 12,259,457 B2 * | 3/2025 | Choi | .................... | H04B 17/373 |
| 2005/0047515 A1 * | 3/2005 | Walton | ................ | H04L 27/2647 375/267 |
| 2006/0126753 A1 * | 6/2006 | Jwa | .................... | H04B 1/71052 375/267 |
| 2009/0323871 A1 * | 12/2009 | Merched | .............. | H04L 25/025 375/346 |
| 2022/0385342 A1 * | 12/2022 | Shen | ................ | H04W 52/0245 |

(Continued)

OTHER PUBLICATIONS

Heliot et al. Title: "An Empirical Study of the Stochastic Nature of Electromagnetic Field Exposure in Massive MIMO Systems", Jun. 13, 2022, (Year: 2022).*

(Continued)

*Primary Examiner* — Christopher M Crutchfield
*Assistant Examiner* — Syed Ahmed
(74) *Attorney, Agent, or Firm* — QUALCOMM Incorporated

(57) ABSTRACT

Methods and apparatus for beam management where a beam is selected based on an estimated channel correlation matrix. The apparatus determines a channel correlation matrix based on downlink SSB reference signal received at the UE. The apparatus estimates a RSRP of a plurality of beams associated with an uplink channel based on the channel correlation matrix and associated beam weights. The apparatus selects a first beam from the plurality of beams having a highest estimated RSRP for communication with a base station. The apparatus communicates with the base station via the first beam.

30 Claims, 8 Drawing Sheets

(56) References Cited

U.S. PATENT DOCUMENTS

| | | | |
|---|---|---|---|
| 2023/0093045 A1* | 3/2023 | Shah ................... | H04B 7/0619 |
| | | | 370/252 |
| 2024/0297723 A1* | 9/2024 | Orhan ................... | H04B 7/084 |

OTHER PUBLICATIONS

Talvitie et al., Title : "Positioning of High-speed Trains using 5G New Radio Synchronization Signals", IEEE 2018 (Year: 2018).*
Boiko et al., Title: "Analysis of Signal Synchronization Conditions in 5G Mobile Information Technologies", © 2022 IEEE (Year: 2022).*
Z. Gao et al., "Super-Resolution Sparse MIMO-OFDM Channel Estimation Based on Spatial and Temporal Correlations," in IEEE Communications Letters, vol. 18, No. 7, pp. 1266-1269, Jul. 2014, doi: 10.1109/LCOMM.2014.2325027. (Year: 2014).*
Zhou et al. Title: "5G-Based Measurements and Characterizations of Low-Altitude Tethered Balloon Multipath Channel", IEEE 2021 (Year: 2021).*
Taniguchi, Shen Sha and Karasawa, "Statistical Distribution of Eigenvalues of Correlation Matrices in independent identically distributed MIMO Channels under Rayleigh Fading," 2005 IEEE 16th International Symposium on Personal, Indoor and Mobile Radio Communications, Berlin, Germany, 2005 (Year: 2005).*
Yoshioka, Takuya, and Tomohiro Nakatani. "Generalization of multi-channel linear prediction methods for blind MIMO impulse response shortening." IEEE Transactions on Audio, Speech, and Language Processing 20.10 (2012): 2707-2720. (Year: 2012).*

* cited by examiner

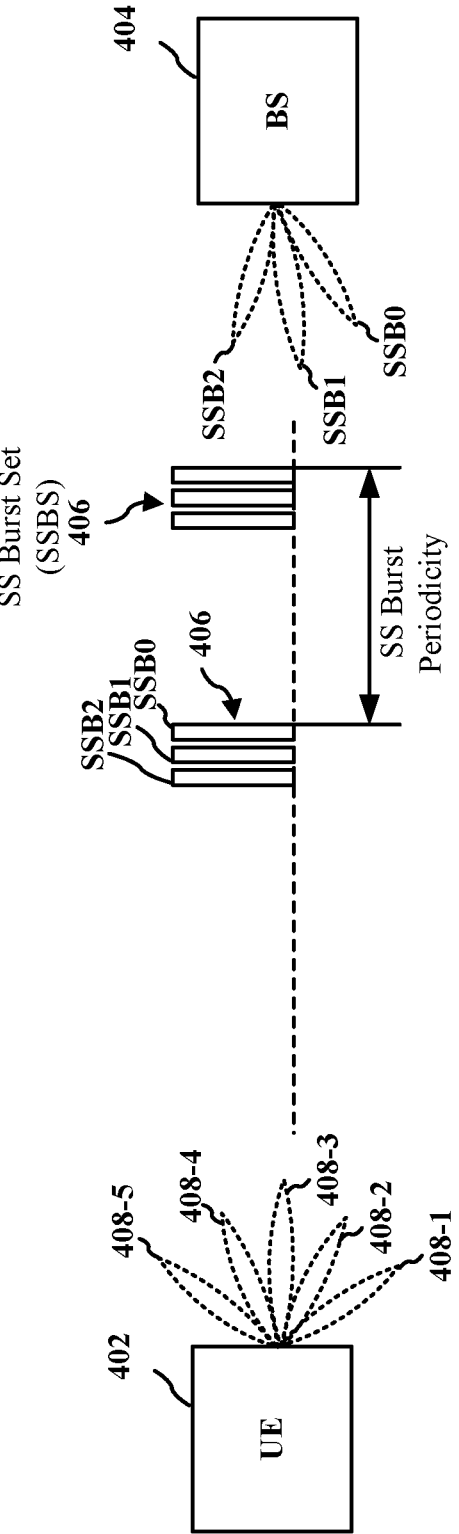
FIG. 4

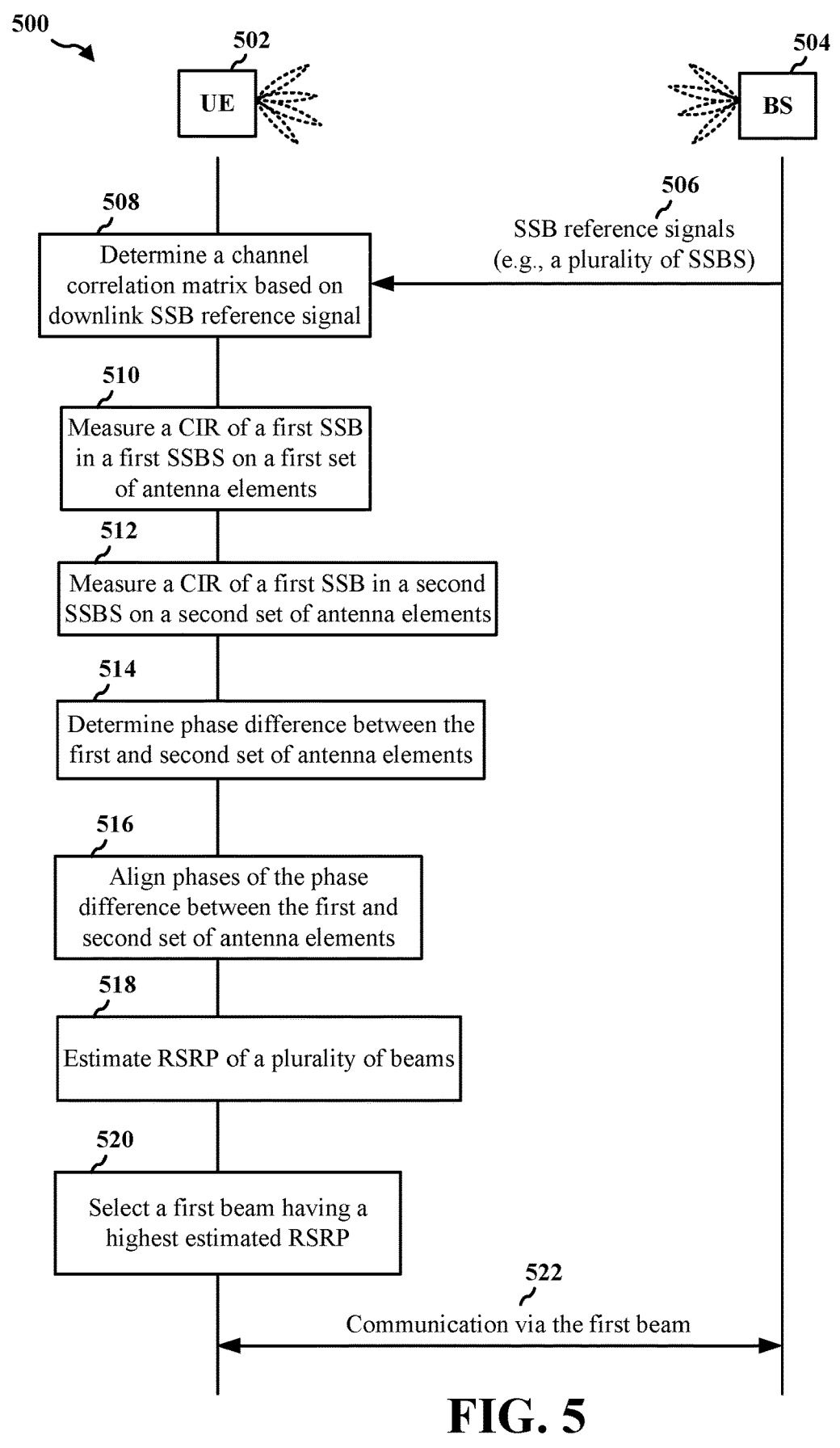

500

502

UE

504

BS

506

SSB reference signals
(e.g., a plurality of SSBS)

508

Determine a channel
correlation matrix based on
downlink SSB reference signal

510

Measure a CIR of a first SSB
in a first SSBS on a first set
of antenna elements

512

Measure a CIR of a first SSB in a second
SSBS on a second set of antenna elements

514

Determine phase difference between the
first and second set of antenna elements

516

Align phases of the phase
difference between the first and
second set of antenna elements

518

Estimate RSRP of a plurality of beams

520

Select a first beam having a
highest estimated RSRP

522

Communication via the first beam

FIG. 5

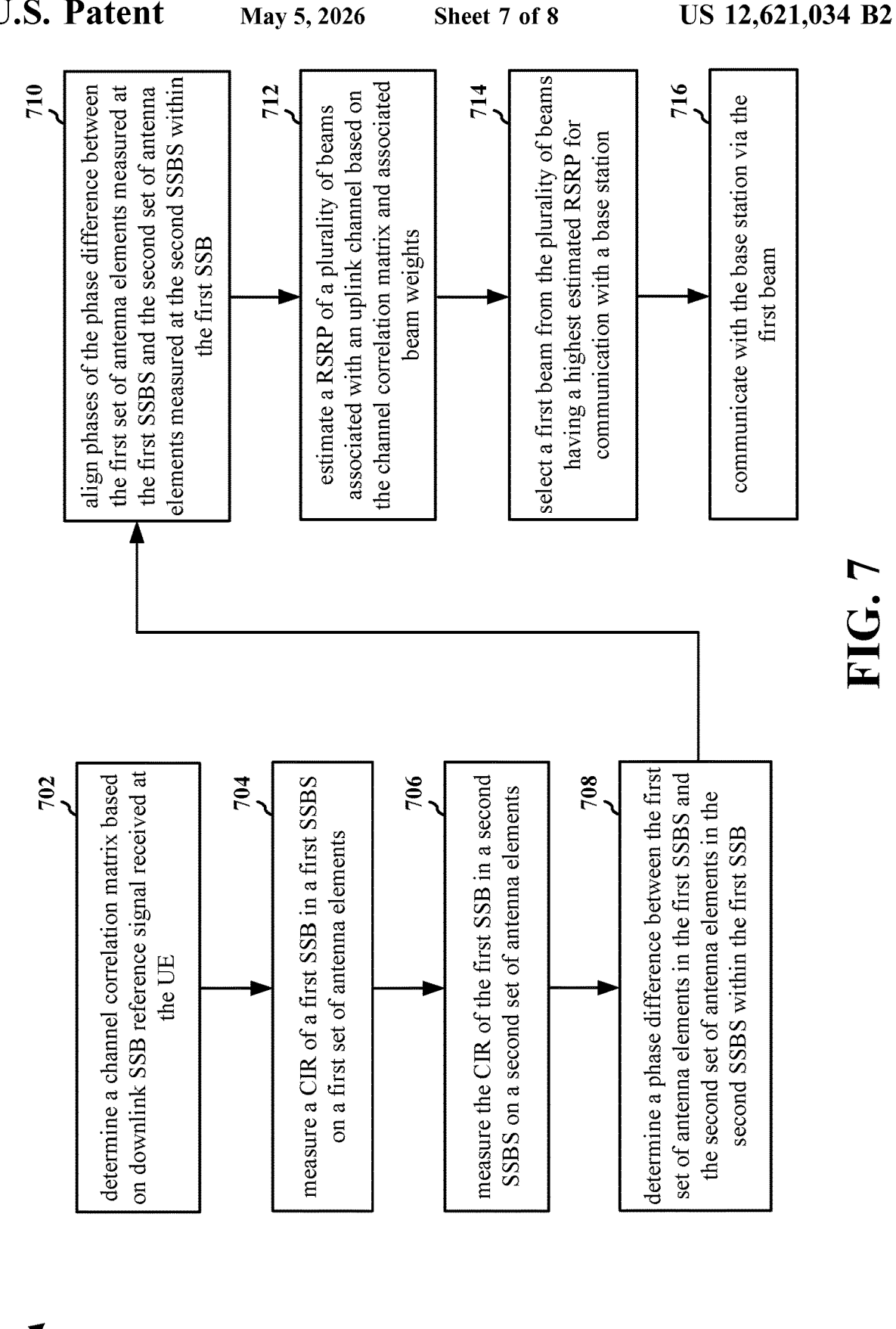

710 — align phases of the phase difference between the first set of antenna elements measured at the first SSBS and the second set of antenna elements measured at the second SSBS within the first SSB 712 — estimate a RSRP of a plurality of beams associated with an uplink channel based on the channel correlation matrix and associated beam weights 714 — select a first beam from the plurality of beams having a highest estimated RSRP for communication with a base station 716 — communicate with the base station via the first beam 702 — determine a channel correlation matrix based on downlink SSB reference signal received at the UE 704 — measure a CIR of a first SSB in a first SSBS on a first set of antenna elements 706 — measure the CIR of the first SSB in a second SSBS on a second set of antenna elements 708 — determine a phase difference between the first set of antenna elements in the first SSBS and the second set of antenna elements in the second SSBS within the first SSB

ONE-SHOT BEAM MANAGEMENT

TECHNICAL FIELD

The present disclosure relates generally to communication systems, and more particularly, to a configuration for beam management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus determines a channel correlation matrix based on downlink synchronization signal block (SSB) reference signal received at the UE. The apparatus estimates a reference signal received power (RSRP) of a plurality of beams associated with an uplink channel based on the channel correlation matrix and associated beam weights. The apparatus selects a first beam from the plurality of beams having a highest estimated RSRP for communication with a base station. The apparatus communicates with the base station via the first beam.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 illustrates an example of a beam management configuration, in accordance with aspects presented herein.

FIG. 5 is a call flow diagram of signaling between a UE and a base station.

FIG. 7 is a flowchart of a method of wireless communication.

DETAILED DESCRIPTION

Figure 1:
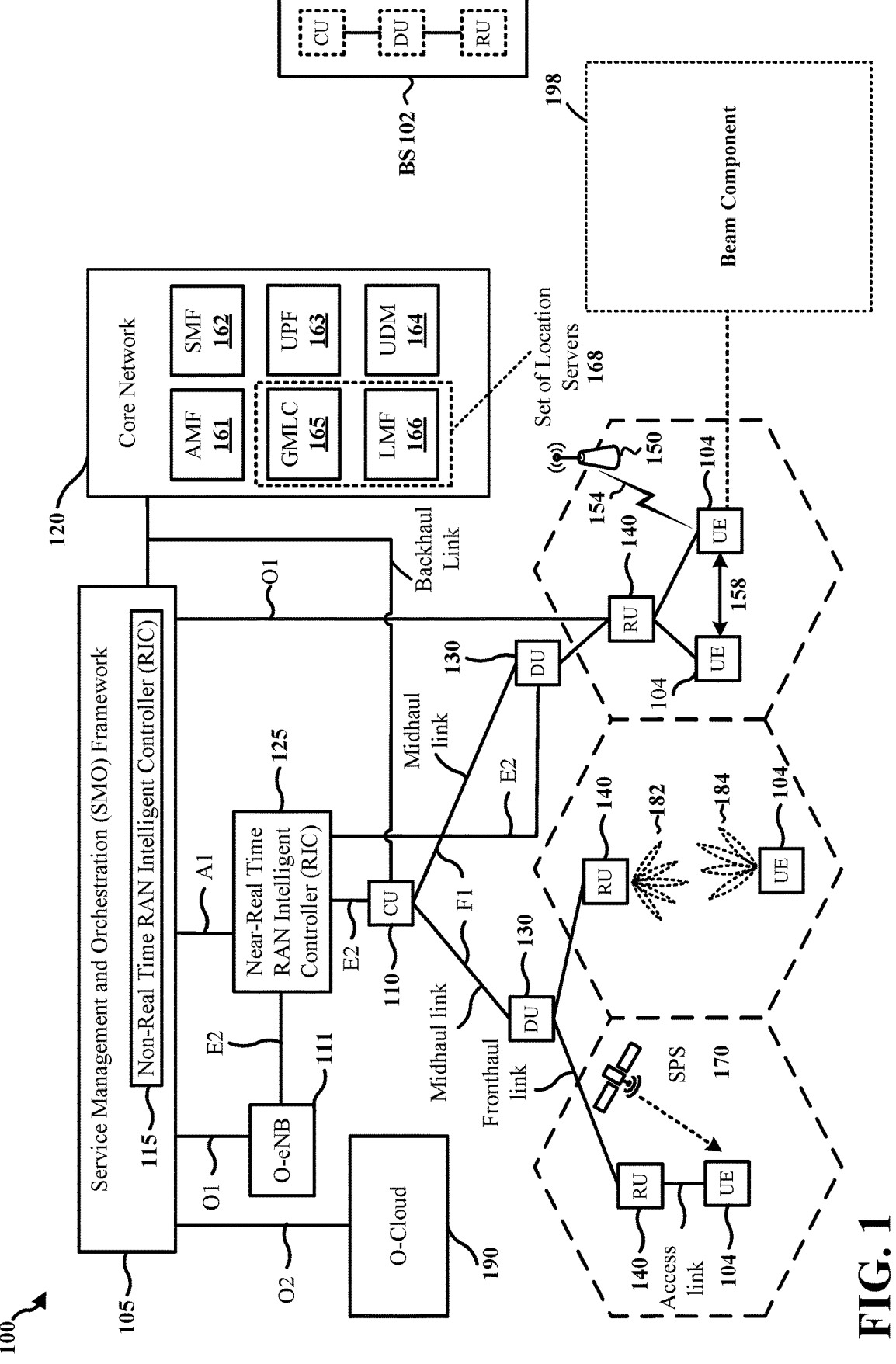
FIG. 1 is a diagram illustrating an example of a wireless communications system and an access network.

In wireless communications, beam management may rely on a parent, child, or neighbor beam relationship for beam tracking. Beam tracking of parent, child, or neighbor beams may include the maintenance of a voluminous list of beams which may delay the beam tracking process. The parent, child, or neighbor beam relationship may not be reliable in some instances. In some instances, the beam relationship may be unreliable in out of coverage areas or due to blockage at the UE by the user, such as, due to the positioning of the user's hand which may cause a blockage or distort the E-field, which may degrade beam tracking performance.

Aspects presented herein provide a configuration for beam management where a beam is selected based on an estimated channel correlation matrix. The configuration may estimate all beams of a plurality of beams in one-shot, where all the beams are measured at the same time, based on the estimated channel correlation matrix. The configuration may find the highest quality beam without relying on any beam relationship.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a beam component 198 configured to determine a channel correlation matrix based on downlink synchronization signal block (SSB) reference signal received at the UE; estimate a reference signal received power (RSRP) of a plurality of beams associated with an uplink channel based on the channel correlation matrix and associated beam weights; select a first beam from the plurality of beams having a highest estimated RSRP for communication with a base station; and communicate with the base station via the first beam.

Although the following description may be focused on 5G NR, the concepts described herein may be applicable to other similar areas, such as LTE, LTE-A, CDMA, GSM, and other wireless technologies.

Figures 2A, 2B, 2C, 2D:
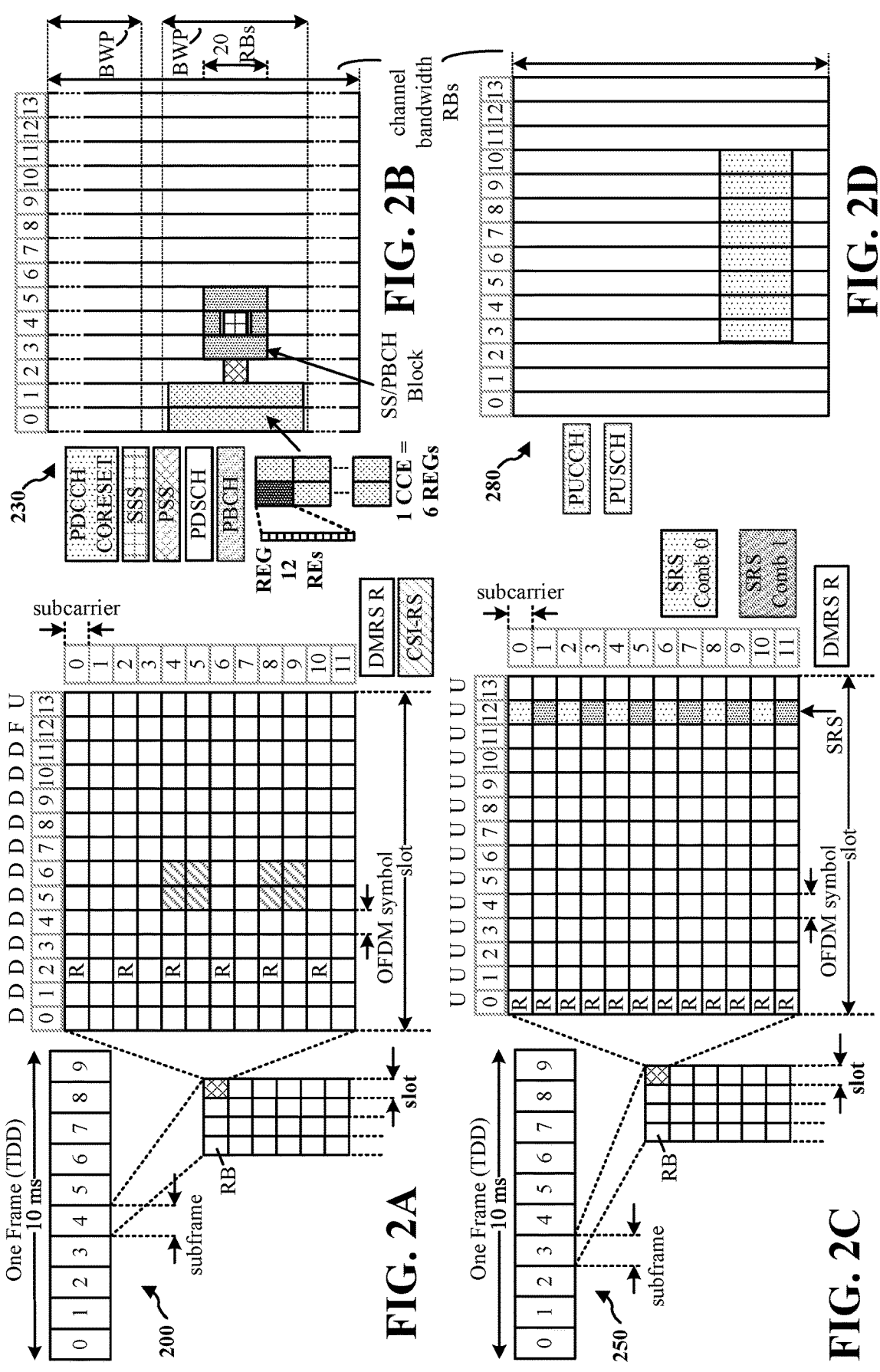
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
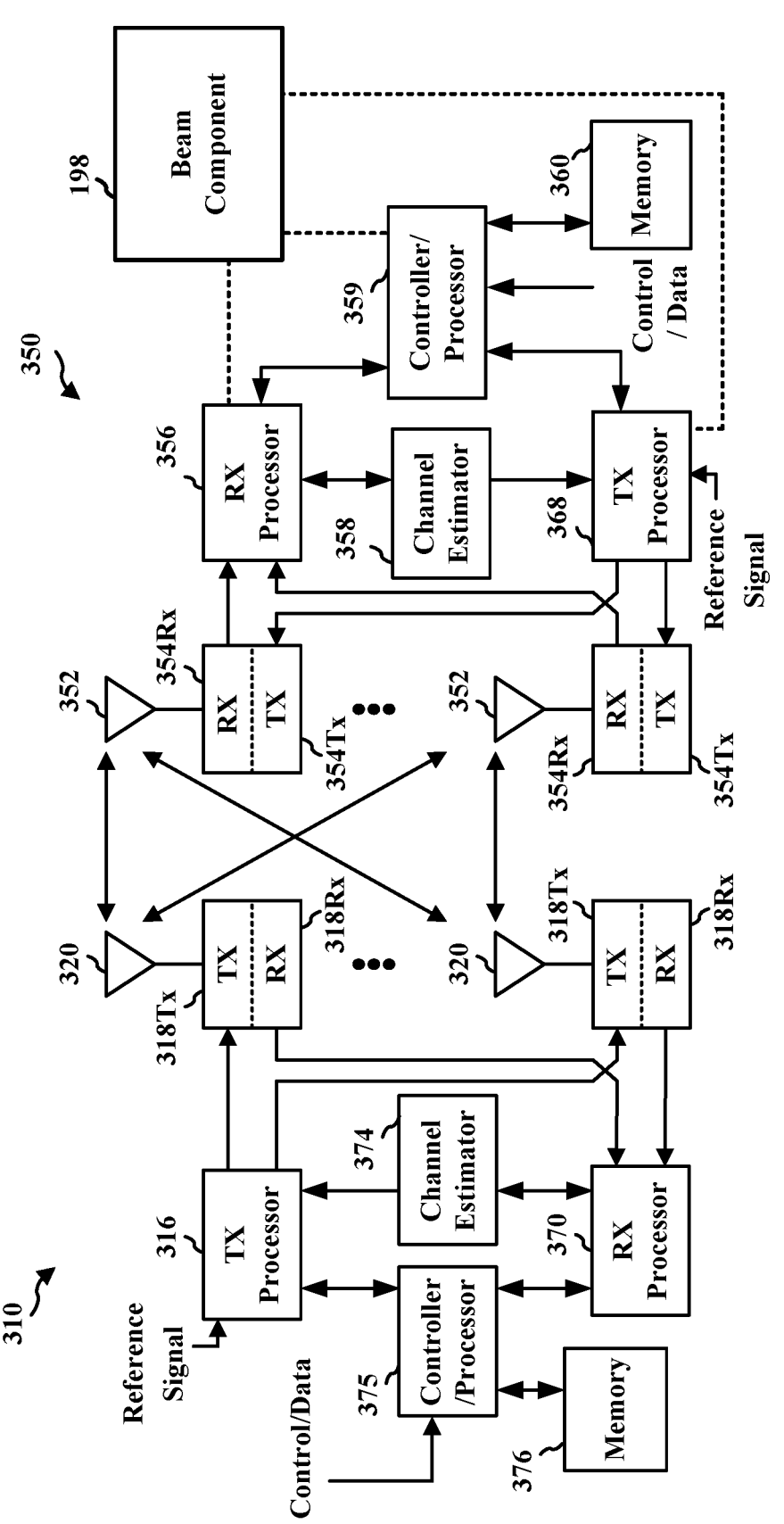
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality. The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets.

The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam component 198 of FIG. 1.

In wireless communications, beam management may rely on a parent, child, or neighbor beam relationship for beam tracking. A parent beam may comprise a wide beam, a child beam may comprise a narrow beam, and a neighbor beam may comprise an adjacent beam. Beam tracking of parent, child, or neighbor beams may include the maintenance of a voluminous list of beams which may delay the beam tracking process. The parent, child, or neighbor beam relationship may not be reliable in some instances. For example, in some instances, the beam relationship may become unreliable in out of coverage areas or fringe coverage areas. In some instances, the beam relationship may be unreliable due to blockage at the UE by the user, such as, due to the positioning of the user's hand which may cause a blockage or distort the E-field, which may degrade beam tracking performance.

Conventional beam tracking may be slow to respond to environmental changes where there is a sudden or unexpected blockage, or in instances where a good cluster is detected, and may take a prolonged time to find a beam having the highest quality.

Aspects presented herein provide a configuration for beam management where a beam is selected based on an estimated channel correlation matrix. The configuration may estimate all beams of a plurality of beams in one-shot, where all the beams are measured at the same time, based on the estimated channel correlation matrix. The configuration may find the highest quality beam without relying on any beam relationship. At least one advantage of the disclosure is that the configuration may respond to an environmental change in an efficient manner.

In some instances, the UE may be configured to estimate the channel correlation matrix R. Based on the channel correlation matrix R, the UE may predict the RSRP of all the beams based on the estimated channel correlation matrix R and the beam weights, in one shot. The beam weights may be preconfigured or known. From this estimation, the UE may select a beam which has the highest predicted RSRP for communication.

In some instances, for example in diagram 400 of FIG. 4, a UE 402 may comprise a subarray with 5 antenna elements (e.g., 408-1, 408-2, 408-3, 408-4, 408-5) and may communicate with a base station 404. The corresponding channel correlation matrices may be estimated with only 2 synchronization signal burst sets (SSBS) by using PBCH DMRS based beam management, which may allow for a measurement of 3 beams during each SSBS. In some instances, the channel correlation matrix may be estimated by measuring a channel impulse response (CIR) on the first 3 antenna elements (e.g., 408-1, 408-2, 408-3). The CIR may then be measured on the last 3 antenna elements (e.g., 408-3, 408-4, 408-5), where the $3^{rd}$ antenna element 408-3 is used as a reference beam. The first 3 antenna elements may comprise a first set of antenna elements, and the last 3 antenna elements may comprise a second set of antenna elements, where at least one antenna element is shared between the first set and the second set of antenna elements. The disclosure is not intended to be limited to the aspects disclosed herein. For example, in some instances, the UE may have more or less than 5 antenna elements. In some instances, the first set of antenna elements and the second set of antenna elements have the same or different number of antenna elements, where at least one antenna element is shared between the first set and the second set of antenna elements.

A phase jump may be determined between the two SSBS s 406, 406 using the reference beam. The phases may be aligned by correcting or adjusting the phase jump. The estimated channel correlation matrix R may be determined based on the correlation between the CIR of the elements, based on:

$$\hat{R}_{mn} = h_m^H h_n,$$

where $h_m$ and $h_n$ are the CIR at the m-th and n-th element, with proper phase correction from the reference beam.

In some aspects, for a UE with 2 subarrays for two polarizations, the channel correlation matrix may be obtained for each of the two polarizations, e.g., $\hat{R}_0$ and $\hat{R}_1$. In some aspects, for the k-th static beam weights (e.g., $w_{0,k}$, $w_{1,k}$) on two polarizations, the estimated sum RSRP may be based on:

$$RSRP_{est}(k) = w_{0,k}^H \hat{R}_0 w_{0,k} + w_{1,k}^H \hat{R}_1 w_{1,k}$$

The best or highest quality beam pair identifier is $$k_{opt} = \arg\max_k RSRP_{est}(k)$$

which may be used as a serving UE beam.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102 and. Further, a UE 502 may correspond to at least UE 104. In another example, in the context of FIG. 3, the base station 504 may correspond to base station 310 and the UE 502 may correspond to UE 350.

At 506, the base station 504 may transmit one or more downlink SSB reference signals. The UE 502 may receive the one or more downlink SSB reference signals from the base station 504. The base station 504 may transmit the one or more downlink SSB reference signals within a plurality of synchronization signal burst sets (SSBS). For example, the base station 504 may transmit a first SSB reference signal in a first SSBS, and may transmit the first SSB reference signal in a second SSBS. The base station may transmit the one or more downlink SSB reference signals based on any of the aspects described in connection with FIG. 4.

At 508, the UE 502 may determine a channel correlation matrix. The UE 502 may determine the channel correlation matrix based on the downlink SSB reference signal received at the UE. The UE may determine the channel correlation based on any of the aspects described in connection with FIG. 4.

At 510, to determine the channel correlation matrix, the UE 502 may measure a channel impulse response (CIR) of a first SSB in a first synchronization signal burst set (SSBS) on a first set of antenna elements. In some aspects, at least a physical broadcast channel (PBCH) and a synchronization signal of the first SSB of the first SSBS may be measured to determine the CIR. Beams associated with a first symbol and a second symbol of the PBCH and a symbol of the first SSB may be measured within the first SSBS.

At 512, to determine the channel correlation matrix, the UE 502 may measure the CIR of the first SSB in a second SSBS. The UE may measure the CIR of the first SSB in the second SSBS on a second set of antenna elements.

At 514, to determine the channel correlation matrix, the UE 502 may determine phase difference between the first and second set of antenna elements. For example, the UE may determine a phase difference between the first set of antenna elements in the first SSBS and the second set of antenna elements in the second SSBS within the first SSB. In some aspects, at least one antenna element may be shared between the first set of antenna elements and the second set of antenna elements. The at least one antenna element shared between the first set of antenna elements and the second set of antenna elements may be a reference beam utilized to determine the phase difference. In some aspects, the RSRP for each beam of the plurality of beams may be estimated based on a combination of the CIR for each antenna elements within the first set of antenna elements and the second set of antenna elements with the associated beam weights.

At 516, the UE 502 may align phases of the phase difference between the first set of antennas and the second set of antennas. The UE may align phases of the phase difference between the first set of antenna elements measured at the first SSBS and the second set of antenna elements measured at the second SSBS within the first SSB. The UE may align phases of the phase difference between the first set of antenna elements measured at the first SSBS and the second set of antenna elements measured at the second SSBS within the first SSB to determine the channel correlation matrix. The UE may determine the channel correlation matrix based on a correlation between the CIR of the first set of antenna elements and the second set of antenna elements.

At 518, the UE 502 may estimate a RSRP of a plurality of beams associated with an uplink channel. The UE may estimate the RSRP of the plurality of beams associated with the uplink channel based on the channel correlation matrix and associated beam weights.

At 520, the UE 502 may select a first beam from the plurality of beams. The UE may select the first beam from the plurality of beams having a highest estimated RSRP for communication with a base station.

At 522, the UE 502 may communicate with the base station 504 via the first beam. The first beam having the highest estimated RSRP for communication with the base station and selected from the plurality of beams.

Figure 6:
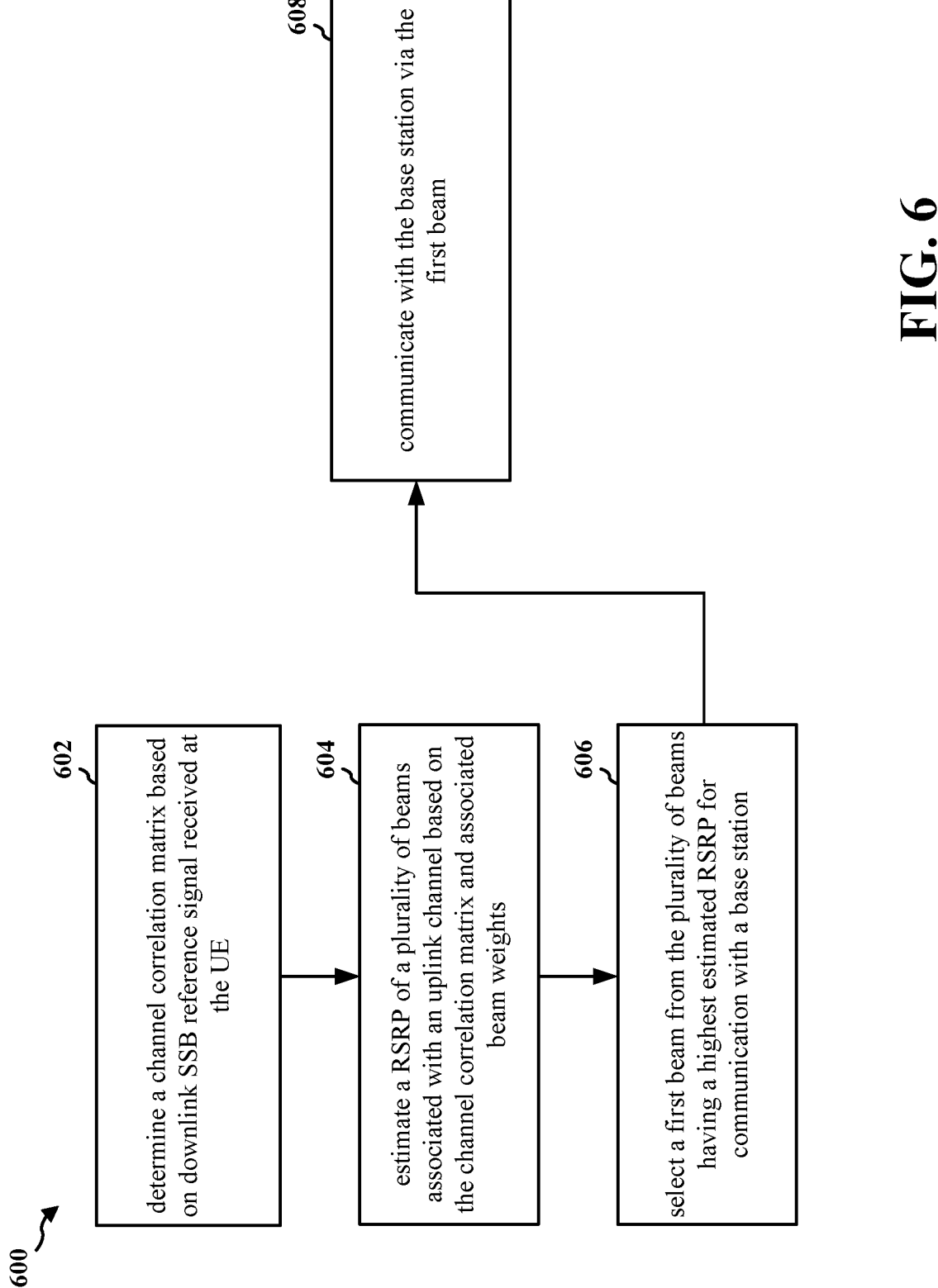
FIG. 6 is a flowchart of a method of wireless communication.

FIG. 6 is a flowchart 600 of a method of wireless communication. The method may be performed by a UE (e.g., the UE 104; the apparatus 804). One or more of the illustrated operations may be omitted, transposed, or contemporaneous. The method may a UE to select a beam from a plurality of beams having a highest estimated RSRP based on a channel correlation matrix.

At 602, the UE may determine a channel correlation matrix. For example, 602 may be performed by beam component 198 of apparatus 804. The UE may determine the channel correlation matrix based on downlink SSB reference signal received at the UE.

At 604, the UE may estimate a RSRP of a plurality of beams associated with an uplink channel. For example, 604 may be performed by beam component 198 of apparatus 804. The UE may estimate the RSRP of the plurality of beams associated with the uplink channel based on the channel correlation matrix and associated beam weights.

At 606, the UE may select a first beam from the plurality of beams. For example, 606 may be performed by beam component 198 of apparatus 804. The UE may select the first beam from the plurality of beams having a highest estimated RSRP for communication with a base station.

At 608, the UE may communicate with a base station. For example, 608 may be performed by beam component 198 of apparatus 804. The UE may communicate with the base station via the first beam.

FIG. 7 is a flowchart 700 of a method of wireless communication. The method may be performed by a UE (e.g., the UE 104; the apparatus 804). One or more of the illustrated operations may be omitted, transposed, or contemporaneous. The method may a UE to select a beam from a plurality of beams having a highest estimated RSRP based on a channel correlation matrix.

At 702, the UE may determine a channel correlation matrix. For example, 702 may be performed by beam component 198 of apparatus 804. The UE may determine the channel correlation matrix based on downlink SSB reference signal received at the UE.

At 704, to determine the channel correlation matrix, the UE may measure a CIR of a first SSB in a first SSBS on a first set of antenna elements. For example, 704 may be performed by beam component 198 of apparatus 804. In some aspects, at least a PBCH and a synchronization signal of the first SSB of the first SSBS may be measured to determine the CIR. Beams associated with a first symbol and a second symbol of the PBCH and a symbol of the first SSB may be measured within the first SSB S.

At 706, the UE may measure the CIR of the first SSB in a second SSBS. For example, 706 may be performed by beam component 198 of apparatus 804. The UE may measure the CIR of the first SSB in the second SSBS on a second set of antenna elements.

At 708, the UE may determine a phase difference between the first set of antenna elements in the first SSBS and the second set of antenna elements in the second SSBS within the first SSB. For example, 708 may be performed by beam component 198 of apparatus 804. In some aspects, at least one antenna element may be shared between the first set of antenna elements and the second set of antenna elements. The at least one antenna element shared between the first set of antenna elements and the second set of antenna elements may be a reference beam utilized to determine the phase difference. In some aspects, the RSRP for each beam of the plurality of beams may be estimated based on a combination of the CIR for each antenna elements within the first set of antenna elements and the second set of antenna elements with the associated beam weights.

At 710, the UE may align phases of the phase difference between the first set of antennas and the second set of antennas. For example, 710 may be performed by beam component 198 of apparatus 804. The UE may align phases of the phase difference between the first set of antenna elements measured at the first SSBS and the second set of antenna elements measured at the second SSBS within the first SSB. The UE may align phases of the phase difference between the first set of antenna elements measured at the first SSBS and the second set of antenna elements measured at the second SSBS within the first SSB to determine the channel correlation matrix. The UE may determine the channel correlation matrix based on a correlation between the CIR of the first set of antenna elements and the second set of antenna elements.

At 712, the UE may estimate a RSRP of a plurality of beams associated with an uplink channel. For example, 712 may be performed by beam component 198 of apparatus 804. The UE may estimate the RSRP of the plurality of beams associated with the uplink channel based on the channel correlation matrix and associated beam weights.

At 714, the UE may select a first beam from the plurality of beams. For example, 714 may be performed by beam component 198 of apparatus 804. The UE may select the first beam from the plurality of beams having a highest estimated RSRP for communication with a base station.

At 716, the UE may communicate with a base station. For example, 716 may be performed by beam component 198 of apparatus 804. The UE may communicate with the base station via the first beam.

Figure 8:
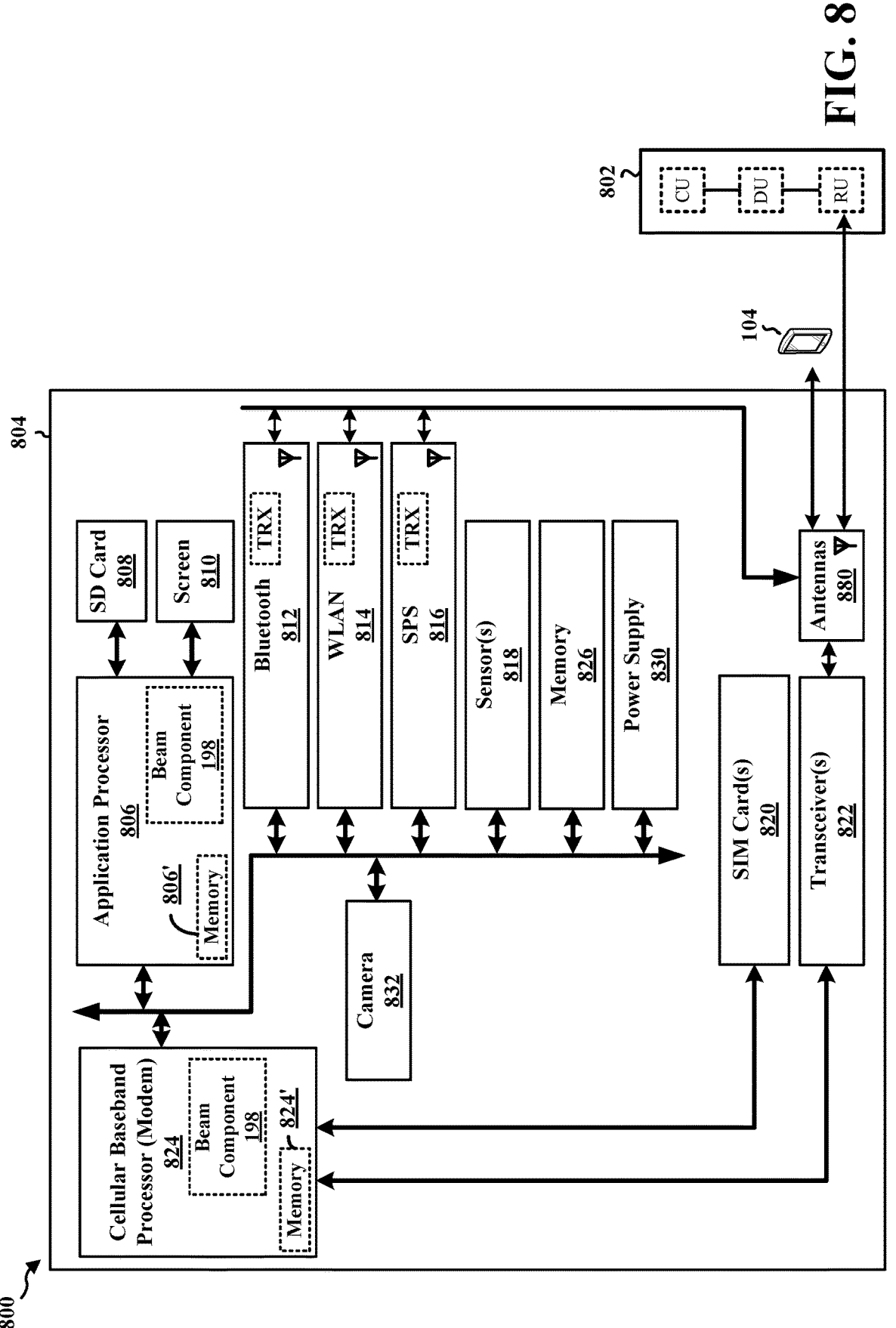
FIG. 8 is a diagram illustrating an example of a hardware implementation for an example apparatus and/or network entity.

FIG. 8 is a diagram 800 illustrating an example of a hardware implementation for an apparatus 804. The apparatus 804 may be a UE, a component of a UE, or may implement UE functionality. In some aspects, the apparatus 804 may include a cellular baseband processor 824 (also referred to as a modem) coupled to one or more transceivers 822 (e.g., cellular RF transceiver). The cellular baseband processor 824 may include on-chip memory 824'. In some aspects, the apparatus 804 may further include one or more subscriber identity modules (SIM) cards 820 and an application processor 806 coupled to a secure digital (SD) card 808 and a screen 810. The application processor 806 may include on-chip memory 806'. In some aspects, the apparatus 804 may further include a Bluetooth module 812, a WLAN module 814, an SPS module 816 (e.g., GNSS module), one or more sensor modules 818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 826, a power supply 830, and/or a camera 832. The Bluetooth module 812, the WLAN module 814, and the SPS module 816 may include an on-chip transceiver (TRX) (or in some cases, just a receiver (RX)). The Bluetooth module 812, the WLAN module 814, and the SPS module 816 may include their own dedicated antennas and/or utilize the antennas 880 for communication. The cellular baseband processor 824 communicates through the transceiver(s) 822 via one or more antennas 880 with the UE 104 and/or with an RU associated with a network entity 802. The cellular baseband processor 824 and the application processor 806 may each include a computer-readable medium/memory 824', 806', respectively. The additional memory modules 826 may also be considered a computer-readable medium/memory. Each computer-readable medium/memory 824', 806', 826 may be non-transitory. The cellular baseband processor 824 and the application processor 806 are each responsible for general processing, including the execution of software stored on the computer-readable medium/memory. The software, when executed by the cellular baseband processor 824/application processor 806, causes the cellular baseband processor 824/application processor 806 to perform the various functions described supra. The computer-readable medium/memory may also be used for storing data that is manipulated by the cellular baseband processor 824/application processor 806 when executing software. The cellular baseband processor 824/application processor 806 may be a component of the UE 350 and may include the memory 360 and/or at least one of the TX processor 368, the RX processor 356, and the controller/processor 359. In one configuration, the apparatus 804 may be a processor chip (modem and/or application) and include just the cellular baseband processor 824 and/or the application processor 806, and in another configuration, the apparatus 804 may be the entire UE (e.g., see 350 of FIG. 3) and include the additional modules of the apparatus 804.

As discussed supra, the component 198 is configured to determine a channel correlation matrix based on downlink SSB reference signal received at the UE; estimate a RSRP of a plurality of beams associated with an uplink channel based on the channel correlation matrix and associated beam weights; select a first beam from the plurality of beams having a highest estimated RSRP for communication with a base station; and communicate with the base station via the first beam. The component 198 may be within the cellular baseband processor 824, the application processor 806, or both the cellular baseband processor 824 and the application processor 806. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 804 may include a variety of components configured for various functions. In one configuration, the apparatus 804, and in particular the cellular baseband processor 824 and/or the application processor 806, includes means for determining a channel correlation matrix based on downlink SSB reference signal received at the UE. The apparatus includes means for estimating a RSRP of a plurality of beams associated with an uplink channel based on the channel correlation matrix and associated beam weights. The apparatus includes means for selecting a first beam from the plurality of beams having a highest estimated RSRP for communication with a base station. The apparatus includes means for communicating with the base station via the first beam. The apparatus further includes means for measuring a CIR of a first SSB in a first SSBS on a first set of antenna elements. The apparatus further includes means for measuring the CIR of the first SSB in a second SSBS on a second set of antenna elements. The apparatus further includes means for determining a phase difference between the first set of antenna elements in the first SSBS and the second set of antenna elements in the second SSBS within the first SSB. The apparatus further includes means for aligning phases of the phase difference between the first set of antenna elements measured at the first SSBS and the second set of antenna elements measured at the second SSBS within the first SSB to determine the channel correlation matrix based on a correlation between the CIR of the first set of antenna elements and the second set of antenna elements. The means may be the component 198 of the apparatus 804 configured to perform the functions recited by the means. As described supra, the apparatus 804 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE comprising determining a channel correlation matrix based on downlink SSB reference signal received at the UE; estimating a RSRP of a plurality of beams associated with an uplink channel based on the channel correlation matrix and associated beam weights; selecting a first beam from the plurality of beams having a highest estimated RSRP for communication with a base station; and communicating with the base station via the first beam.

Aspect 2 is the method of aspect 1, further including measuring a CIR of a first SSB in a first SSBS on a first set of antenna elements; measuring the CIR of the first SSB in a second SSBS on a second set of antenna elements; and determining a phase difference between the first set of antenna elements in the first SSBS and the second set of antenna elements in the second SSBS within the first SSB.

Aspect 3 is the method of any of aspects 1 and 2, further includes that at least one antenna element is shared between the first set of antenna elements and the second set of antenna elements.

Aspect 4 is the method of any of aspects 1-3, further includes that the at least one antenna element shared between the first set of antenna elements and the second set of antenna elements is a reference beam utilized to determine the phase difference.

Aspect 5 is the method of any of aspects 1-4, further including aligning phases of the phase difference between the first set of antenna elements measured at the first SSBS and the second set of antenna elements measured at the second SSBS within the first SSB to determine the channel correlation matrix based on a correlation between the CIR of the first set of antenna elements and the second set of antenna elements.

Aspect 6 is the method of any of aspects 1-5, further includes that at least a PBCH and a synchronization signal of the first SSB of the first SSBS are measured to determine the CIR.

Aspect 7 is the method of any of aspects 1-6, further includes that beams associated with a first symbol and a second symbol of the PBCH and a symbol of the first SSB are measured within the first SSBS.

Aspect 8 is the method of any of aspects 1-7, further includes that the RSRP for each beam of the plurality of beams is estimated based on a combination of the CIR for each antenna elements within the first set of antenna elements and the second set of antenna elements with the associated beam weights.

Aspect 9 is an apparatus for wireless communication at a UE including at least one processor coupled to a memory and at least one transceiver, the at least one processor configured to implement any of aspects 1-8.

Aspect 10 is an apparatus for wireless communication at a UE including means for implementing any of aspects 1-8.

Aspect 11 is a computer-readable medium storing computer executable code, where the code when executed by a processor causes the processor to implement any of aspects 1-8.

What is claimed is:

1. An apparatus for wireless communication at a user equipment (UE), comprising:
   memory; and
   at least one processor coupled to the memory and, based at least in part on information stored in the memory, the at least one processor is configured to:
      determine a channel correlation matrix based on downlink synchronization signal block (SSB) reference signal received at the UE;
      estimate, across a plurality of antenna elements, a reference signal received power (RSRP) of a plurality of beams at a same time based on the channel correlation matrix and associated beam weights, wherein the RSRP of each of the plurality of beams is associated with an uplink channel;
      select a first beam from the plurality of beams having a highest estimated RSRP for communication with a base station; and
      communicate with the base station via the first beam.

2. The apparatus of claim 1, further comprising a transceiver coupled to the at least one processor.

3. The apparatus of claim 1, wherein to determine the channel correlation matrix, the at least one processor is configured to:
   measure a channel impulse response (CIR) of a first SSB in a first synchronization signal burst set (SSBS) on a first set of antenna elements;
   measure the CIR of the first SSB in a second SSBS on a second set of antenna elements; and
   determine a phase difference between the first set of antenna elements in the first SSBS and the second set of antenna elements in the second SSBS within the first SSB.

4. The apparatus of claim 3, wherein at least one antenna element is shared between the first set of antenna elements and the second set of antenna elements.

5. The apparatus of claim 4, wherein the at least one antenna element shared between the first set of antenna elements and the second set of antenna elements is a reference beam utilized to determine the phase difference.

6. The apparatus of claim 3, wherein the at least one processor is further configured to:

align phases of the phase difference between the first set of antenna elements measured at the first SSBS and the second set of antenna elements measured at the second SSBS within the first SSB to determine the channel correlation matrix based on a correlation between the CIR of the first set of antenna elements and the second set of antenna elements.

7. The apparatus of claim 3, wherein at least a physical broadcast channel (PBCH) and a synchronization signal of the first SSB of the first SSBS are measured to determine the CIR.

8. The apparatus of claim 7, wherein to measure beams associated with a first symbol and a second symbol of the PBCH and a symbol of the first SSB, the at least one processor is configured to measure beams associated with the first symbol and the second symbol of the PBCH and the symbol of the first SSB within the first SSBS.

9. The apparatus of claim 3, wherein to estimate the RSRP for each beam of the plurality of beams, the at least one processor is configured to estimate the RSRP for each beam of the plurality of beams based on a combination of the CIR for each antenna elements within the first set of antenna elements and the second set of antenna elements with the associated beam weights.

10. A method of wireless communication at a user equipment (UE), comprising:

determining a channel correlation matrix based on downlink synchronization signal block (SSB) reference signal received at the UE;

estimating, across a plurality of antenna elements, a reference signal received power (RSRP) of a plurality of beams at a same time based on the channel correlation matrix and associated beam weights, wherein the RSRP of each of the plurality of beams is associated with an uplink channel;

selecting a first beam from the plurality of beams having a highest estimated RSRP for communication with a base station; and communicating with the base station via the first beam.

11. The method of claim 10, wherein the determining the channel correlation matrix further comprising:

measuring a channel impulse response (CIR) of a first SSB in a first synchronization signal burst set (SSBS) on a first set of antenna elements;

measuring the CIR of the first SSB in a second SSBS on a second set of antenna elements; and determining a phase difference between the first set of antenna elements in the first SSBS and the second set of antenna elements in the second SSBS within the first SSB.

12. The method of claim 11, wherein at least one antenna element is shared between the first set of antenna elements and the second set of antenna elements.

13. The method of claim 12, wherein the at least one antenna element shared between the first set of antenna elements and the second set of antenna elements is a reference beam utilized to determine the phase difference.

14. The method of claim 11, further comprising:

aligning phases of the phase difference between the first set of antenna elements measured at the first SSBS and the second set of antenna elements measured at the second SSBS within the first SSB to determine the channel correlation matrix based on a correlation between the CIR of the first set of antenna elements and the second set of antenna elements.

15. The method of claim 11, wherein at least a physical broadcast channel (PBCH) and a synchronization signal of the first SSB of the first SSBS are measured to determine the CIR.

16. The method of claim 15, wherein beams associated with a first symbol and a second symbol of the PBCH and a symbol of the first SSB are measured within the first SSBS.

17. The method of claim 11, wherein the RSRP for each beam of the plurality of beams is estimated based on a combination of the CIR for each antenna elements within the first set of antenna elements and the second set of antenna elements with the associated beam weights.

18. An apparatus for wireless communication at a user equipment (UE), comprising:

means for determining a channel correlation matrix based on downlink synchronization signal block (SSB) reference signal received at the UE;

means for estimating, across a plurality of antenna elements, a reference signal received power (RSRP) of a plurality of beams at a same time based on the channel correlation matrix and associated beam weights, wherein the RSRP of each of the plurality of beams is associated with an uplink channel;

means for selecting a first beam from the plurality of beams having a highest estimated RSRP for communication with a base station; and means for communicating with the base station via the first beam.

19. The apparatus of claim 18, wherein the means for determining the channel correlation matrix further comprising:

means for measuring a channel impulse response (CIR) of a first SSB in a first synchronization signal burst set (SSBS) on a first set of antenna elements;

means for measuring the CIR of the first SSB in a second SSBS on a second set of antenna elements; and means for determining a phase difference between the first set of antenna elements in the first SSBS and the second set of antenna elements in the second SSBS within the first SSB.

20. The apparatus of claim 19, wherein at least one antenna element is shared between the first set of antenna elements and the second set of antenna elements.

21. The apparatus of claim 20, wherein the at least one antenna element shared between the first set of antenna elements and the second set of antenna elements is a reference beam utilized to determine the phase difference.

22. The apparatus of claim 19, further comprising:

means for aligning phases of the phase difference between the first set of antenna elements measured at the first SSBS and the second set of antenna elements measured at the second SSBS within the first SSB to determine the channel correlation matrix based on a correlation between the CIR of the first set of antenna elements and the second set of antenna elements.

23. The apparatus of claim 19, wherein at least a physical broadcast channel (PBCH) and a synchronization signal of the first SSB of the first SSBS are measured to determine the CIR.

24. The apparatus of claim 23, wherein beams associated with a first symbol and a second symbol of the PBCH and a symbol of the first SSB are measured within the first SSBS.

25. The apparatus of claim 19, wherein the RSRP for each beam of the plurality of beams is estimated based on a combination of the CIR for each antenna elements within the first set of antenna elements and the second set of antenna elements with the associated beam weights.

26. A computer-readable medium storing computer executable code at a user equipment (UE), the code when executed by a processor causes the processor to:

determine a channel correlation matrix based on downlink synchronization signal block (SSB) reference signal received at the UE;

estimate, across a plurality of antenna elements, a reference signal received power (RSRP) of a plurality of beams at a same time based on the channel correlation matrix and associated beam weights, wherein the RSRP of each of the plurality of beams is associated with an uplink channel;

select a first beam from the plurality of beams having a highest estimated RSRP for communication with a base station; and communicate with the base station via the first beam.

27. The computer-readable medium of claim 26, wherein the code when executed by the processor causes the processor to:

measure a channel impulse response (CIR) of a first SSB in a first synchronization signal burst set (SSBS) on a first set of antenna elements;

measure the CIR of the first SSB in a second SSBS on a second set of antenna elements; and determine a phase difference between the first set of antenna elements in the first SSBS and the second set of antenna elements in the second SSBS within the first SSB.

28. The computer-readable medium of claim 27, wherein at least one antenna element is shared between the first set of antenna elements and the second set of antenna elements.

29. The computer-readable medium of claim 28, wherein the at least one antenna element shared between the first set of antenna elements and the second set of antenna elements is a reference beam utilized to determine the phase difference.

30. The computer-readable medium of claim 27, wherein the code when executed by the processor causes the processor to:

align phases of the phase difference between the first set of antenna elements measured at the first SSBS and the second set of antenna elements measured at the second SSBS within the first SSB to determine the channel correlation matrix based on a correlation between the CIR of the first set of antenna elements and the second set of antenna elements.

\* \* \* \* \*